United States Patent Office 3,359,357
Patented Dec. 19, 1967

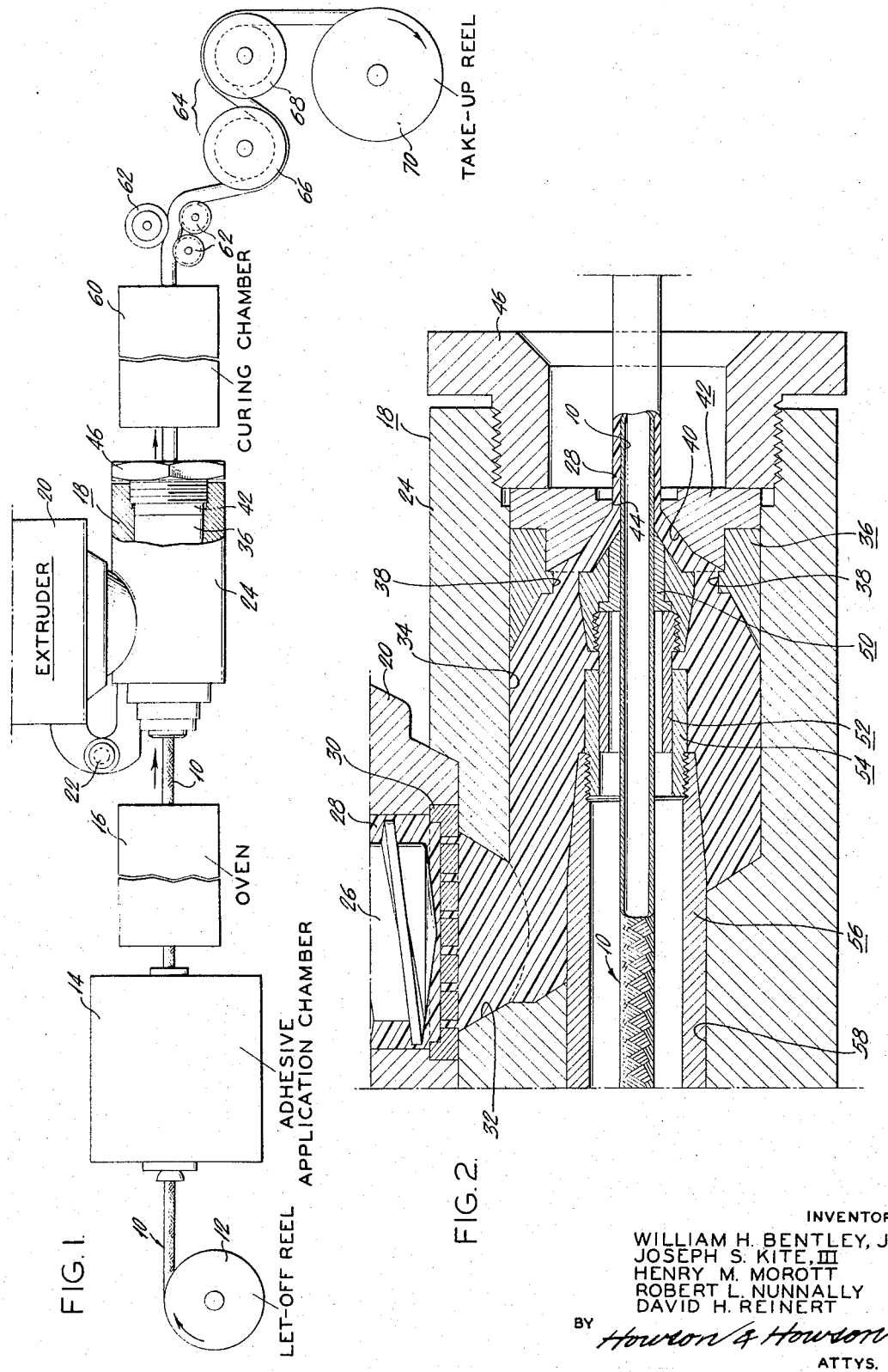

3,359,357
PROCESS FOR COATING CONTINUOUS FLEXIBLE TUBING
William H. Bentley, Jr., Haverford, Joseph S. Kite III, Downingtown, Henry M. Morott, Trappe, Robert L. Nunnally, Norristown, and David H. Reinert, Wayne, Pa., assignors to Raychem Corporation, Redwood City, Calif., a corporation of California
Filed Oct. 21, 1963, Ser. No. 317,485
1 Claim. (Cl. 264—173)

The present invention relates to a process for extruding a coating onto a continuous flexible tubing and is particularly adapted to the extrusion of a plastic coating such as synthetic rubber onto a tubing of fabric construction.

As set forth in U.S. Patent 3,106,748 assigned with the present application to a common assignee, a principal problem inherent in the extrusion of a coating upon a flexible tube is the tendency of the tube walls to collapse under the extrusion pressure. In the above patent a process and apparatus are disclosed for extruding a coating onto a flexible tube without the previously required internal die, collapse of the tube in the extrusion area being prevented by compacting and rigidifying the tube immediately prior to the extrusion by reducing the diameter of the tube.

In the present invention, a coating is extruded upon a a flexible tube without the use of an internal die and without radially compressing the tube prior to the extrusion step. Collapse of the flexible tube in the present instance is prevented by a controlled tensioning of the tube and the use of a controlled extrusion pressure sufficient to provide effective bonding of the coating to the tube without deformation thereof.

It is accordingly a first object of the present invention to provide a process and apparatus for coating continuous flexible tubing by means of which a coating is extruded upon the tubing without collapsing the wall of the tubing in the extrusion area, there being no use of internal dies to support the tubing in this area.

A further object of the invention is to provide a process and apparatus as described which permits the extrusion of the coating upon flexible tubing without physically compressing the tubing radialy inward.

An additional object of the invention is to provide a process and apparatus as described which may respectively be carried out and constructed in a simple and economical manner.

Additional objects and advantages of the invention will be more readily apparent from the following detailed description of an embodiment thereof when taken together with the accompanying drawings in which:

FIG. 1 is a schematic elevational view of apparatus in accordance with the present invention for extruding a coating upon a flexible continuous tube; and FIG. 2 is a sectional view through the extruder showing the details of the extruder elements.

Referring to the drawings, FIG. 1 shows schematically the various components of apparatus for effecting the process steps involved in the present extrusion method. Considering the components from left to right, a flexible continuous tube 10 is supplied from a supply reel 12, equipped with braking means for maintaining a predetermined back tension on the tubing. The tube shown in the drawings is a braided fabric tube but may be of a variety of constructions and materials.

The tubing passes from the supply reel into the adhesive application chamber 14 within which a spray of adhesive is applied to the surface of the tubing. The tubing then passes into an oven 16 in which heat is applied to eliminate the volatile adhesive elements and set the adhesive on the tube.

Following passage through the oven 16, the tubing enters the extruder 18, the details of which are most readily understood by reference to the enlarged view of FIG. 2. Extruder cylinder 20 is hingedly attached at 22 to the extruder crosshead 24. With the extruder cylinder 20 secured on the crosshead 24 in the extruding position illustrated, feed screw 26 within the cylinder is operable to advance a plastic material 28 through perforate braker plate 30 and through the radial passage 32 into the axial bore 34 of the crosshead 24.

Guider 36 is mouned in the axial bore 34 and includes angularly spaced holes 38 extending axially permitting passage of plastic material through the guider and into the conical chamber 40 formed by the die 42 positioned in the axial bore adjacent the guider 36. Annular die opening 44 governs the thickness of the extruded coating upon the tubing. Threaded collar 46 coacting with the internally threaded end of the crosshead 24 maintains the guider and juxtaposed die in the proper position with the crosshead bore.

Flanged bushing 50 fitting within a concentric bore in the guider provides guide means for centering the flexible tubing 10 in the die opening 44. The tubing, in passing through the axial bore of the crosshead into the guider bushing, is enclosed by a first sleeve 52 threadedly secured to the guider, and a second sleeve 54 fitting in sealing relationship over the first sleeve, the second sleeve being threadedly attached to the liner 56 passing through bore 58 in the crosshead.

The tubing upon passing from the extruder enters the curing chamber 60 wherein heat is applied to cure the extruded plastic coating. The tubing then passes between guide wheels 62, into the capstan 64 which includes traction wheels 66 and 68, and onto take-up reel 70.

The important steps of the process, as indicated above, include the tensioning of the tubing in the extrusion region and the controlling of the effective extrusion pressure such that the extrusion takes place without collapsing or deforming the tubing. The tensioning of the tubing can be accomplished in various ways, for example by means of an appropriate braking means on the supply reel or by means of frictional drag supplied by guider dies. The effected extrusion pressure may similarly be controlled in more than one manner. The basic factors affecting the extrusion pressure are the feed rate of the extruder, the bleeder adjustment in the extruder and the rate of travel of the tubing. It can be understood that equivalent extrusion pressures can be obtained with various combinations of these several controlling factors.

With the above concepts of the process in mind, the specific operation of the described apparatus may be more readily understood as follows. As shown in FIG. 1, the tubing is passed through the various components of the apparatus and is led around the capstan and take-up reel. The tubing in this instance is tensioned by the proper adjustment of the supply reel braking means and the capstan tractional wheel drive means to maintain a predetermined tube tension. Assuming there to be no slippage of the tubing at the capstan drive wheels, the tensioning of the tubing is controlled principally by the supply wheel braking means.

The tubing passes initially into the adhesive application chamber and is coated by an adhesive spray or other suitable arrangement with a suitable adhesive layer which is dried in the oven 16. The main purpose of the adhesive is to provide a tubing surface layer which is receptive to adhesion of the extruded plastic coating. The adhesive application also serves to rigidify the surface of the flexible tubing and thus aids in preventing collapse of the tubing under extrusion pressures, although experiments have proven that the further stiffening effect provided by the adhesive is, although desirable, not essential.

On passing into the extruder, the tubing in the apparatus illustrated is centered in the die opening by means of the guider bushing which tightly engages the tubing to prevent the tubing from becoming off-center and accumulating an uneven extruded coating. The worm speed of the extruder, crosshead bleed pressure, and feed rate of the tubing are regulated in such a manner as to maintain a constant effective extrusion pressure, and the plastic material is extruded in a well known manner through the guider and conical channel 40 onto the flexible tubing. It has been found that the angle at which the conical chamber is inclined to the tubing surface may vary widely without materially affecting the results of the process, although in the preferred embodiment as shown the angle is approximately 30°. On passing from the extruder, the coated tubing is cured in the curing chamber 60 and passes therefrom through the capstan onto the take-up reel.

The process may be used with various types of flexible tubing and is particularly adapted to a braided, knitted, or woven fabric tubing. The covering applied may be of any suitable plastic material such as synthetic rubber. The adhesive employed should be chosen with respect to the type of plastic material and tubing employed so as to provide maximum adhesion of the plastic material on the tubing.

Manifestly, changes in details of construction can be effected by those skilled in the art without departing from the spirit and scope of the invention as defined in and limited solely by the appended claim.

We claim:

A process for coating continuous flexible tubing with a plastic material comprising passing the tubing through an extruder, tensioning said tubing by drawing said tubing from a restraining force in a direction longitudinal of said tubing during passage through said extruder, extruding a plastic material onto said tubing in said extruder, and controlling the effective pressure of extrusion and the longitudinal tensioning of said tubing such that the extrusion takes place without collapsing or deforming the tubing, the controlling of the effective pressure of the extrusion being effected by regulation of the rate of travel of said tubing and the flow rate of the plastic material through the extruder.

References Cited

UNITED STATES PATENTS

| | | | |
|---|---|---|---|
| 995,782 | 6/1911 | Garretson | 264—95 |
| 2,286,992 | 6/1942 | Muller | |
| 2,647,296 | 8/1953 | Shive | 264—173 |
| 2,874,411 | 2/1959 | Berquist | |
| 3,106,748 | 10/1963 | Skobel | 264—173 |

FOREIGN PATENTS 1,265,687   5/1961   France.

ROBERT F. WHITE, *Primary Examiner.*

L. S. SQUIRES, T. J. CARVIS, *Assistant Examiners.*